United States Patent
Mozeika et al.

(10) Patent No.: US 9,427,876 B2
(45) Date of Patent: Aug. 30, 2016

(54) INFLATABLE ROBOTS, ROBOTIC COMPONENTS AND ASSEMBLIES AND METHODS INCLUDING SAME

(71) Applicant: iRobot Corporation, Bedford, MA (US)

(72) Inventors: Annan Michael Mozeika, Groton, MA (US); Mark Robert Claffee, Methuen, MA (US); Martin Buehler, Watertown, MA (US)

(73) Assignee: iRobot Corporation, Bedford, MA (US)

(*) Notice: Subject to any disclaimer, the term of this patent is extended or adjusted under 35 U.S.C. 154(b) by 826 days.

(21) Appl. No.: 13/713,558

(22) Filed: Dec. 13, 2012

(65) Prior Publication Data

US 2013/0152724 A1 Jun. 20, 2013

Related U.S. Application Data

(60) Provisional application No. 61/617,864, filed on Mar. 30, 2012, provisional application No. 61/577,114, filed on Dec. 19, 2011.

(51) Int. Cl.
*B25J 17/00* (2006.01)
*B25J 15/00* (2006.01)
*B25J 5/00* (2006.01)
(Continued)

(52) U.S. Cl.
CPC .............. *B25J 17/00* (2013.01); *B25J 5/005* (2013.01); *B25J 9/0015* (2013.01); *B25J 9/142* (2013.01); *B25J 15/0009* (2013.01); *B62D 57/032* (2013.01); *Y10S 901/01* (2013.01); *Y10T 74/20329* (2015.01)

(58) Field of Classification Search
CPC ........ B25J 5/005; B25J 9/0015; B25J 9/142; B25J 15/0009; B25J 15/0023; B25J 15/0028; B25J 17/00; B25J 17/0241; B25J 17/025; B25J 18/06; B65D 57/02; B65D 57/032; Y10T 74/20305; Y10T 74/20329; Y10S 901/01; Y10S 901/27; Y10S 901/28
USPC .......... 74/490.01, 490.05; 294/213; 700/245, 700/301; 901/1, 27, 28
See application file for complete search history.

(56) References Cited

U.S. PATENT DOCUMENTS 4,267,608 A * 5/1981 Bora, Jr. ............... A61F 2/3836
                                              403/111
4,575,297 A * 3/1986 Richter ................. B25J 9/0006
                                              414/5

(Continued)

OTHER PUBLICATIONS

Baldur, et al, "Inflatable Manipulator", Proc. IR Robots, 1985, pp. 12.24-12.36.

(Continued)

*Primary Examiner* — Michael McCullough
*Assistant Examiner* — Brendan Tighe
(74) *Attorney, Agent, or Firm* — Myers Bigel & Sibley, P.A.

(57) ABSTRACT

A robotic joint assembly includes a first structural member, a second structural member, and a rolling flexure joint joining the first structural member to the second structural member to provide at least one degree of freedom between the first and second structural members. The rolling flexure joint includes first and second flexible hinge members each having one end secured to the first structural member and an opposing end secured to the second structural member. The first and second flexible hinge members cross one another between the first and second structural members.

18 Claims, 12 Drawing Sheets

(51) Int. Cl.
B25J 9/00 (2006.01)
B25J 9/14 (2006.01)
B62D 57/032 (2006.01)

(56) References Cited

U.S. PATENT DOCUMENTS

| | | | | |
|---|---|---|---|---|
| 5,782,927 A * | 7/1998 | Klawitter | .............. | A61F 2/4241 623/21.15 |
| 6,718,766 B2 * | 4/2004 | Seto | ........................ | B25J 9/142 60/476 |

OTHER PUBLICATIONS

Bicchi, et al. "Dealing with the Saftey-Performance Tradeoff in Robot Arms Design and Control: Fast and 'Soft-Arm' Tactics", *IEEE Robotics & Automation Magazine*, 2004, pp. 22-33. IEEE.

Cadogan, et al. "Intelligent Flexible Materials for Deployable Space Structures", InFlex, 2006, pp. 1-15. ILC Dover LP.

Daerden, et al. "Pneumatic Artificial Muscles: Actuators for Robotics and Automation", 2000. pp. 1-11.

Jones. "Inflatable Robotics for Planetary Applications", International Symposium on Artificial Intelligence, Robotics & Automation in Space, 2001, pp. 1-6. Montreal, Canada.

Koren. "Reconfigurable Manufacturing Systems", 2010, pp. 1-9. Retrieved on Mar. 26, 2012. http://sitemaker.umich.edu/ykoren/research.

Mozeika, et al. "The First Steps of a Robot Based on Jamming Skin Enabled Locomotion", 2009, pp. 1-2.

Pratt, et al. "Series Elastic Actuators", MIT Artificial Intelligence Laboratory and Laboratory for Computer Science, 1995, pp. 399-406. IEEE.

Pratt, et al. "Series Elastic Actuators for Legged Robots", 2004, pp. 1-10.

Salomonski, et al. "Light Robot Arm Based on Inflatable Structure", Israel Institute of Technology, 1995, pp. 87-90. Haifa, Israel.

Sanan, et al. "Continuum Robots: An Approach to Safer Robots", 2010, pp. 1-12. Robotics Institute, Carnegie Mellon University. Pittsburgh, PA.

Sanan, et al. "Robots with Inflatable Links", International Conference on Intelligent Robots and Systems, 2009, pp. 4331-4336. IEEE/RSJ, St. Louis, MO.

Sanan. "The Inflatable Arm", pp. 1-2. Retrieved on Mar. 26, 2012. http://cs.cmu.edu/~ssanan/.

Scarborough, et al. "Applications of Inflatable Rigidizable Structures", Society for the Advancement of Material and Process Engineering, 2006, pp. 1-15. ILC Dover LP, Frederica, DE.

Steltz, et al. "Jamming as an Enabling Technology for Soft Robotics", 2010, pp. 1-9.

Steltz, et al. "JSEL: Jamming Skin Enabled Locomotion", 2009, pp. 1-6.

Tatlicioglu, et al. "New Dynamic Models for Planar Extensible Continuum Robot Manipulators", International Conference on Intelligent Robots and Systems, 2007, pp. 1485-1490. IEEE/RSJ, San Diego, CA.

"The Ant-Roach", Otherlab, Nov. 21, 2011, pp. 1-8. Retrieved on Oct. 18, 2012. http://www.otherlab.com/news/2011/11/21/the-ant-roach/.

Yoon, et al. "Safe Arm with MR-based Passive Compliant Joints and Visco-elastic Covering for Service Robot Applications", International Conference on Intelligent Robots and Systems, 2003, pp. 2191-2196. IEEE/RSJ, Las Vegas, Nevada.

Zollo, et al. "An Experimental Study on Compliance Control for a Redundant Personal Robot Arm", *Robotics and Autonomous Systems*, 2003, pp. 101-129.

* cited by examiner

Lift Leg

Lower Leg

Leg Forward

Leg Backward

INFLATABLE ROBOTS, ROBOTIC COMPONENTS AND ASSEMBLIES AND METHODS INCLUDING SAME

RELATED APPLICATION(S)

This application claims the benefit of and priority from U.S. Provisional Patent Application Ser. No. 61/617,864, filed Mar. 30, 2012, and claims the benefit of and priority from U.S. Provisional Patent Application Ser. No. 61/577,114, filed Dec. 19, 2011, the disclosures of which are incorporated herein by reference in their entireties.

STATEMENT OF GOVERNMENT SUPPORT

This invention was made with support under Defense Advanced Research Projects Agency (DARPA) Contract No. W91CRB-11-C-0050 awarded by DARPA with Army Research, Development and Engineering Command (RDECOM). The Government has certain rights in the invention.

FIELD OF THE INVENTION

The present invention relates to robots and components thereof.

BACKGROUND

Robots, including mobile robots, have been successfully integrated into military, industrial, and commercial settings. However, their further integration and wide acceptance may be impeded by high weight, low packing density, high cost, and safety concerns.

SUMMARY OF THE INVENTION

According to embodiments of the present invention, a robotic joint assembly includes a first structural member, a second structural member, and a rolling flexure joint includes first and second flexible hinge members each having one end secured to the first structural member and an opposing end secured to the second structural member. The first and second flexible hinge members cross one another between the first and second structural members.

In some embodiments, the first and second flexible hinge members are first and second ribbons.

In some embodiments, the robotic joint assembly includes a third flexible hinge member having one end secured to the first structural member and an opposing end secured to the second structural member. The third flexible hinge member crosses the second flexible hinge member between the first and second structural members and the second flexible hinge member is interposed between the first and third flexible hinge members.

According to some embodiments: the first structural member has a first end surface and first and second side surfaces on opposed sides of the first end surface; the second structural member has a second end surface and third and fourth side surfaces on opposed sides of the second end surface, the third side surface being substantially aligned with the first side surface, and the second side surface being substantially aligned with the fourth side surface; the first flexible hinge member is secured to the first side surface, extends across the first and second end surfaces, and is secured the fourth side surface; and the second flexible hinge member is secured to the second side surface, extends across the first and second end surfaces, and is secured the third side surface.

In some embodiments, at least the first structural member is compliant. According to some embodiments, the first structural member is a compliant inflatable structure. The second structural member may also be a compliant inflatable structure. In some embodiments: the first and second structural members each include an inner structural membrane and an outer structural membrane surrounding the inner structural membrane; the inner structural membrane contains a compressed gas; and the second structural membrane restricts radial expansion of the inner structural membrane to provide a dual-layer tensegrity structure.

According to some embodiments, the rolling flexure joint includes at least one flexible collateral ligament secured to each of the first and second structural members to provide torsional and lateral stability to the rolling flexure joint.

According to embodiments of the present invention, an inflatable robotic assembly includes a support member, an end effector mounted on an end of the support member, and an actuator. The end effector includes first and second inflatable finger members connected to enable the first and second fingers to be moved selectively between an open position and a closed position. The actuator is configured to move the fingers between the open and closed positions.

In some embodiments, the first finger has first and second, relatively moveable, inflatable phalanges. The inflatable robotic assembly may include a rolling flexure joint joining the first and second phalanges to provide at least one degree of freedom between the first and second phalanges. According to some embodiments, the inflatable robotic assembly includes a second rolling flexure joint joining the first finger and the support member to provide at least one degree of freedom between the first finger and the support member.

The inflatable robotic assembly may include a rolling flexure joint joining the first finger and the support member to provide at least one degree of freedom between the first finger and the support member.

In some embodiments, the end effector is under-actuated.

In some embodiments: the first and second inflatable fingers each include an inner structural membrane and an outer structural membrane surrounding the inner structural membrane; the inner structural membrane contains a compressed gas; and the second structural membrane restricts radial expansion of the inner structural membrane to provide a dual-layer tensegrity structure.

According to embodiments of the present invention, an inflatable robotic assembly includes an inflatable structural member and an inflation pressure control system operable to selectively control inflation pressure in the inflatable structural member and to thereby selectively tune compliance of the inflatable structural member.

In some embodiments, the inflation pressure control system includes a compressor or a supply of compressed inflation gas, and a controller.

The inflatable structural member may be a beam.

According to some embodiments, the inflatable structural member is a load bearing arm or limb of a robot.

In some embodiments, the inflatable structural member forms a part of a joint structure, and the inflation pressure control system is operable to selectively tune a stiffness and/or a freedom of movement of a joint between two joined structural members.

In some embodiments: the inflatable structural member includes an inner structural membrane and an outer structural membrane surrounding the inner structural membrane;

the inner structural membrane contains a compressed gas; and the second structural membrane restricts radial expansion of the inner structural membrane to provide a dual-layer tensegrity structure.

According to some embodiments, the inflatable robotic assembly includes a body and the inflatable structural member is an inflatable limb member connected to the body to transit the body.

According to method embodiments of the present invention, a method for operating a robot includes: providing an inflatable robotic assembly including an inflatable structural member; and selectively controlling inflation pressure in the inflatable structural member to thereby selectively tune compliance of the inflatable structural member.

The inflatable structural member may be a load bearing arm or limb of the robot.

In some embodiments, the inflatable structural member is a joint structure, and the method includes selectively tuning a stiffness and/or a freedom of movement of a joint between two joined structural members.

According to embodiments of the present invention, a robot includes a mobile base and a robotic arm assembly mounted on the base. The robotic arm assembly includes an inflatable structural member that can be stowed in or on the mobile base in a deflated condition and can be inflated to deploy the robotic arm assembly.

According to embodiments of the present invention, an inflatable robotic joint assembly includes a mounting structure, a pivotable load-bearing beam, and at least one rolling flexure joint. The mounting structure is formed as a protrusion with a protrusion end surface and first and second protrusion sides. The pivotable load-bearing beam is formed including an inflatable structure, including an outer structural membrane and an inner structural membrane forming a tensegrity structure. The tensegrity structure has one or more of: an inflated-to-uninflated volume ratio of at least 10; an operating pressure in the range of from about 5 PSI to 15 PSI; an inflated mass-to-volume ratio of at least 0.1 g/cm³; and a payload-to-mass ratio of more than 2.5. The load-bearing beam has a proximal beam end having a proximal end surface and first and second proximal sides. The at least one rolling flexure joint has at least one degree of freedom. The rolling flexure joint comprises a first flexure joint ribbon and a second flexure joint ribbon. The proximal beam end is arranged abutting the protrusion, the first protrusion side being substantially aligned with the first proximal side of the proximal beam end and the second protrusion side being substantially aligned with the second proximal side of the proximal beam end. The first flexure joint ribbon is secured to the first protrusion side, extending along the protrusion end surface and proximal end surface, and secured to the second proximal side. The second flexure joint ribbon is secured to the second protrusion side, extending along the protrusion end surface and the proximal end surface, and secured to the first proximal side.

In some embodiments, the inflatable robotic joint assembly further includes a substantially inextendible collateral ligament joining the abutting protrusion end surface and the proximal end surface.

According to some embodiments, the protrusion is a beam end of a second inflatable structure.

According to embodiments of the present invention, an inflatable vehicle includes a first beam, a second, pivotable beam, at least one rolling flexure joint, an actuator, and a controller. The first beam formed includes an inflatable structure including an outer structural membrane and an inner structural membrane forming a tensegrity structure. The second beam is formed including an inflatable structure including an outer structure membrane and an inner structural membrane forming a tensegrity structure. The at least one rolling flexure joint abuts the second, pivotable beam to the first beam. The rolling flexure joint includes a first flexure joint ribbon and a second flexure joint ribbon crossing one another between the first and second beams and secured to each of the first beam and the second, pivotable beam to provide at least one degree of freedom. The actuator is connected between the first beam and second beam to pivot the second beam. The controller commands the actuator to actuate.

According to embodiments of the present invention, an inflatable multi-limbed vehicle includes a body, a first pivotable limb, and a second pivotable limb. The body is formed including an inflatable structure including an outer structural membrane and an inner structural membrane forming a tensegrity structure. The first pivotable limb is formed including an inflatable structure including an outer structure membrane and an inner structural membrane forming a tensegrity structure, and joined to the body by a first rolling flexure joint abutting the first pivotable limb to the body. The second pivotable limb is formed including an inflatable structure including an outer structure membrane and an inner structural membrane forming a tensegrity structure, and joined to the body opposite the first pivotable limb by a second rolling flexure joint abutting the second pivotable limb to the body. The inflatable multi-limbed vehicle further includes: a first actuator for pivoting the first pivotable limb as a first degree of freedom thereof; a second actuator for pivoting the second pivotable limb as a first degree of freedom thereof; a third actuator for flexing the first pivotable limb as a second degree of freedom thereof; a fourth actuator for flexing the second pivotable limb as a second degree of freedom thereof; and a controller commanding the actuator to actuate.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
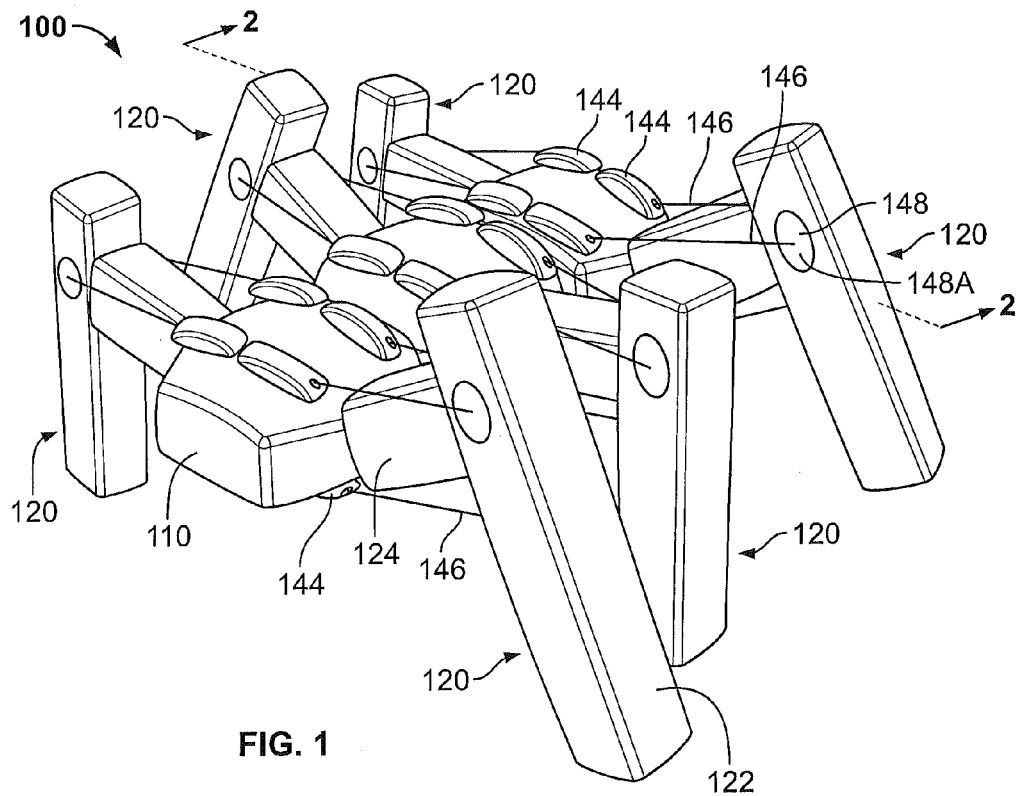
FIG. 1 is a perspective view of a robot according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "programmatically" refers to operations directed and/or primarily carried out electronically by computer program modules, code and instructions.

The aforementioned problems of high weight, low packing density, high cost, and safety concerns (e.g., when used around humans) are often due to the traditional use of heavy, non-compliant materials for robotic structures. The use of these traditional materials for such significant portions of the robot can set a lower limit to the cost, weight and packing density of such systems, making procurement, man portability and logistics complex. When rigid robots are used in close proximity to fragile objects or when interacting with humans, extra care must be taken to avoid collisions and not cause harm. Safe operation can be achieved by increasing compliance of the structural system through mechanical or software means. However, mechanical compliance in robotic structural components is not always desired. For example, when lifting heavy objects, a robotic manipulator arm must remain rigid. Thus, the ability of a robotic system to actively control link compliance as disclosed herein can be highly beneficial.

In accordance with embodiments of the present invention, a robotic assembly is provided including one or more inflatable structural members. Inflatable structural members as disclosed herein can be used in a variety of ways, such as for a manipulator arm for a remotely controlled robot. The inflatable structural member may serve as a link, a limb (e.g., arm or leg) or other appendage (e.g., a finger or phalange) of a robot, and may be configured as an elongate, load bearing beam. The robotic assembly can be used as part of a robot. In some embodiments, the robotic assembly forms a part of a mobile robot, which may be an autonomous or remotely (e.g., wirelessly) controlled robot or unmanned vehicle.

According to some embodiments, a robotic assembly is provided including an end effector having one or more inflatable structural members, such as inflatable fingers or phalanges.

In some embodiments, the compliance or stiffness of the inflatable structural member or members can be tuned or adjusted by adjusting the pressure of an inflation fluid contained therein.

According to some embodiments of the invention, a rolling flexure joint is provided. The rolling flexure joint may be particularly well-suited for use in coupling inflatable structural members.

Figure 3A:
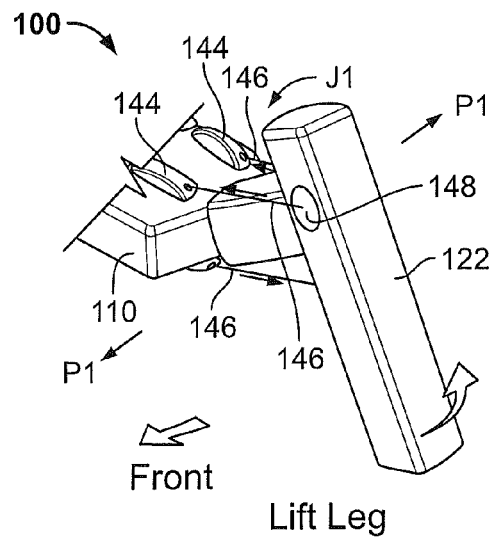
FIGS. 3A-3D are fragmentary, perspective views of an exemplary leg assembly of the robot of FIG. 1 illustrating movements of the leg assembly.
Figure 3B:
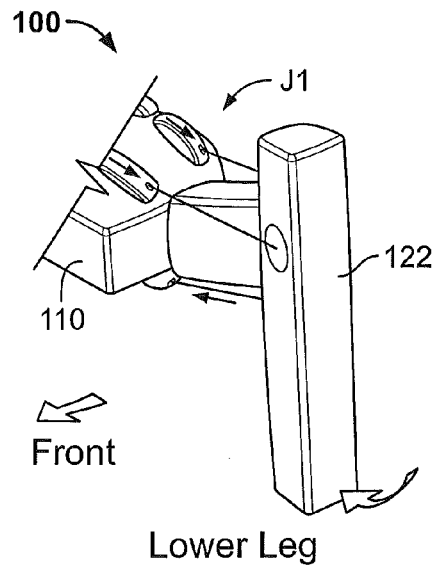
Figure 3C:
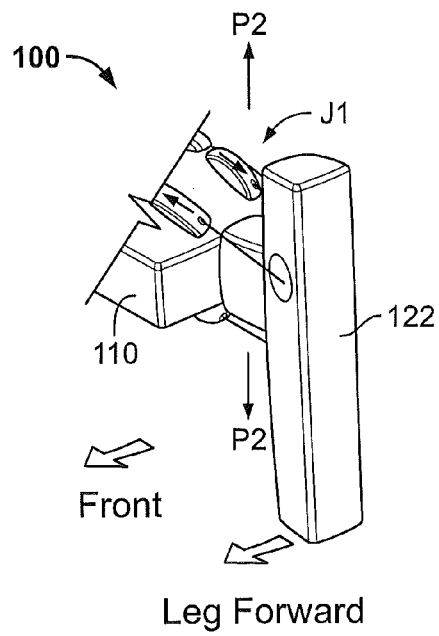
Figure 3D:
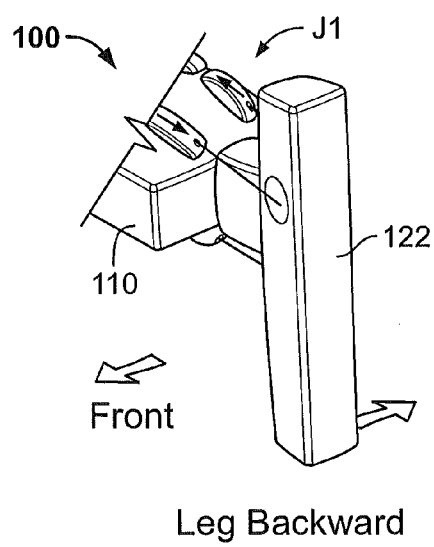
Figure 4:
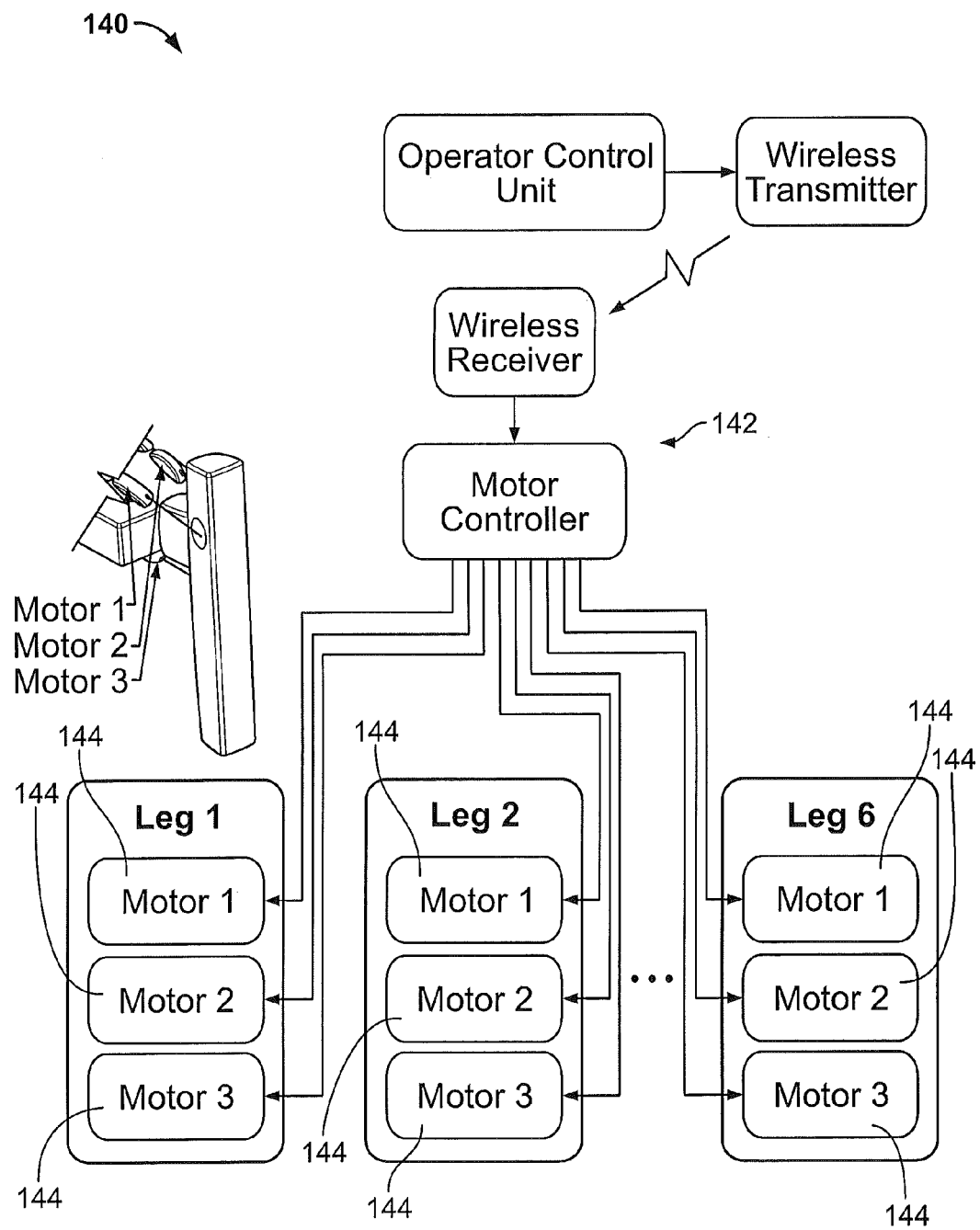
FIG. 4 is a schematic diagram representing a control system of the robot of FIG. 1.

With reference to FIGS. 1-4, a robot 100 according to embodiments of the present invention is shown therein. The robot 100 may be used as a mobile robot platform. The robot 100 includes a body structural member, beam or structure 110, six leg assemblies 120 (FIG. 1) and a control system 140 (FIG. 4). As discussed herein, the body structure 110 and the leg assemblies 120 are inflatable and the control system 140 is operable to move the leg assemblies 120 to effect transit or other desired operations of the robot 100. The illustrated robot 100 is a hexapod; however, robots according to embodiments of the invention can take other forms such bipod, quadrapod, etc.

The inflatable elements as discussed herein may be inflated with any suitable fluid. According to some embodiments, the inflation fluid is a compressible inflation gas. According to some embodiments, the inflation gas is or includes air. The inflation gas F will be referred to hereinbelow as air; however, it will be appreciated that this description likewise applies to other inflation fluids where suitable and with suitable modifications, if needed.

Figure 2:
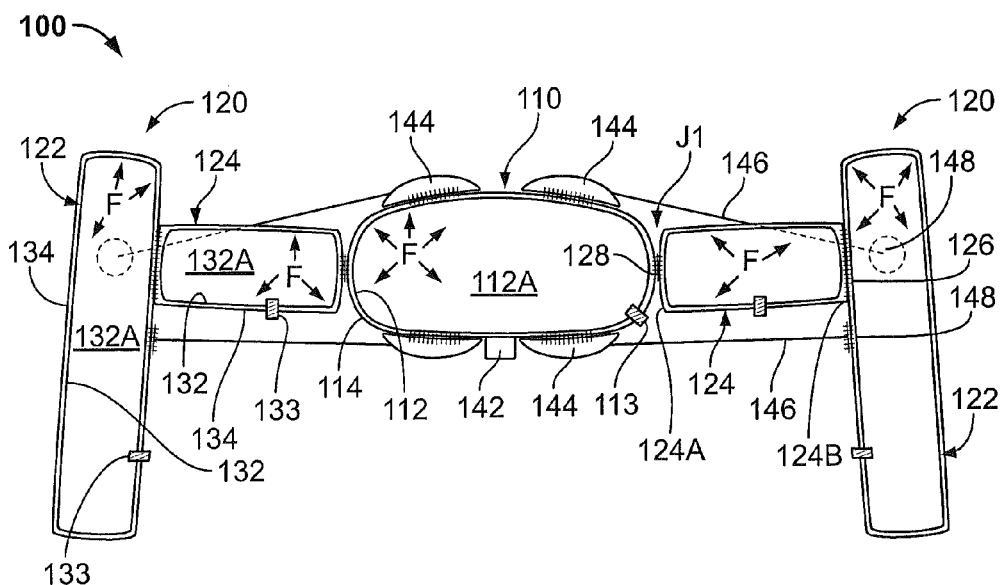
FIG. 2 is a cross-sectional view of the robot of FIG. 1 taken along the line 2-2 of FIG. 1.

With reference to FIG. 2, the body structure 110 includes an airtight inner structural balloon, bladder, bag or membrane 112 surrounded by an outer structural epidermal layer, cover or membrane 114. The inner membrane 112 defines a sealed inner air chamber 112A. According to some embodiments, the inner membrane 112 is formed of a substantially air impermeable polymeric sheet or film and the outer membrane 114 is air permeable. According to some embodiments, the inner membrane 112 is formed of an elastomeric or thermoplastic layer, such polyethylene or rubber. According to some embodiments, the outer membrane 114 is formed of a textile or fabric, such as a cotton or synthetic fiber fabric (e.g., a fabric including Kevlar). A fill port 113 may be provided in the inner membrane 112 for the injection and release of pressurized air F.

The membranes 112, 114 employ a dual layer or bladder and restraint morphology wherein the outer structural membrane 114 acts in tension and the inner airtight membrane 112 contains positively pressurized, compressed air. The two membranes 112, 114 may essentially form a tensegrity structure. In this inflatable structure morphology, the inner air chamber 112 may be oversized so that the outer membrane 114 carries the ultimate tensile loads generated or exerted by the inner air chamber pressure. By separating the structural properties from the requirement to have a sealed volume, high strength textiles can be used to take the structural loads and lightweight thin membranes can be used to contain the air in the structure. This method can provide the ability to use permeable outer skin textile materials. In other words, the outer membrane 114, which is directly exposed to the environment, does not need to be airtight and, depending on the material, should be able to withstand significant abuse before failure. The outer membrane 114 may be formed of a particularly tough or high strength material (e.g., Kevlar). The outer membrane 114 may include a material or materials providing self-healing functionality, such as self-healing polymers. As a further benefit, the outer membrane 114 does not need to be sealed where actuators, joints, or sensors are anchored.

Alternatively, the inflatable body structure 110 may be constructed with more or less than two functional layers as described above. For example, a single layer may be provided that defines the sealed chamber 112A as well as the outer surface of the structure, and this single layer both contains the pressurized contained air and carries the ultimate tensile loads exerted by the contained air.

With reference to FIGS. 1 and 2, each leg assembly 120 includes a support beam 122 and a connector beam 124. The connector beam 124 is secured at one end 124A (FIG. 2) to the body structure 110 (e.g., by stitching 128) and is secured at its opposing end 124B to the support beam 122 (e.g., by stitching 126). According to some embodiments, the connector beam 122 is firmly secured to the support beam 124 so that the positions of the beams 122, 124 are relatively fixed. According to some embodiments, the end 124A of the connector beam 124 is pivotally secured to the body structure 110 at a joint J1 that permits at least two degrees of freedom (DOF) in movement about a pivot axis P1-P1 (FIG. 3A) and about a pivot axis P2-P2 (FIG. 3C).

The connector beam 122 and the support beam 124 of each leg assembly 120 each include an airtight inner structural bag or membrane 132 surrounded by an outer structural cover or membrane 134 and defining a sealed inner air chamber 132A. The membranes 132, 134 may be constructed and cooperate in the same manner as described above with respect to the membranes 112, 114 to form a tensegrity structure. Fill ports 133 are provided in the inner membranes 132 for the injection and release of pressurized air F.

The control system 140 (FIG. 4) includes a controller 142, cable actuators 144, and actuator cables 146. The controller 142 may include a suitable processor and/or a wireless receiver and is adapted to selectively control actuation of the actuators 144. The actuator cables 146 extend from the actuators 144 to respective anchor points 148 (which may be reinforced by strain relief elements or patches 148A) on the support beams 122. The actuators 144 may be actuators of any suitable type, such as twisted string actuators, and can be selectively operated to pull and release (or push) the corresponding leg assemblies 120. The actuators 144 and cables 146 (or strain reliefs 148A) may be stitched or otherwise secured directly to the outer membranes 114, 134. Other suitable types of actuators are discussed hereinbelow. The controller 142 may be remotely controllable by a remote operator control unit via a wireless transmitter and receiver, as illustrated in FIG. 4.

The robot 100 may be used as follows in accordance with methods of the present invention.

The body structure 110 and/or the beams 122, 124 may be provided in a non-inflated, compressed state (e.g., rolled, folded, or simply deflated) to provide a small, compact form factor for storage and transport. For example, the robot 100 may be non-inflated (in whole or in part) and contained in a compartment of a personal pack, a vehicle (e.g., a Humvee), a shipping container, or a cargo hold (e.g., of an aircraft). In some embodiments, the robot 100 is placed on a pallet or other support and dropped from an aircraft by parachute.

The chamber 112A of the body structure 110 and the chambers 132A of the leg assemblies 120 are inflated by any suitable supply of pressurized inflation gas (e.g., air). In some embodiments, the robot 100 is inflated using an onboard air compressor or an onboard supply of compressed air. For example, the robot 100 may include an inflation air pressure control system as described below with regard to the robot 500. In some embodiments, the robot 100 is inflated using an auxiliary air compressor or an auxiliary supply of compressed air not mounted on the robot 100.

The chambers 112A, 132A are inflated until the structural members 110, 122, 124 assume an inflated condition as shown in FIGS. 1-3D and are each rigid or semi-rigid. The degree of rigidity or compliance of each structural member 110, 122, 124 will be a function of the inflation pressure. Higher contained air pressure will provide greater rigidity and lower contained air pressure will provide lesser structural rigidity.

According to some embodiments, the body structure 110 and/or the leg assemblies 120 are selectively inflated to a pressure or pressures providing the degree of compliance or stiffness deemed desirable for the intended operation. That is, the inflation pressures (and thereby the rigidities or stiffnesses) of the members 110, 122, 124 are deliberately selected to tune the compliance and performance characteristics of the robot 100. The inflation pressures of the different components can be selected independently to independently tune the different structures. Variable compliance in the structural members 110, 122, 124 enables the operator to tune the robot 100 for different tasks and environments. For example, the support beams 122 can be made highly compliant or relatively soft when working around humans, and can be made very rigid and relatively hard for heavy lifting tasks. In some embodiments, the compliances of the structural members 110, 122, 124 can be retuned or actively or dynamically tuned. For example, the structural members 110, 122, 124 may be inflated to a first pressure to provide relatively high compliance for a mission in close proximity to humans, and thereafter inflated to a greater pressure for relatively low compliance for heavy lifting.

According to some embodiments, the body structure 110 and/or the leg assemblies 120 are each inflated to a pressure or pressures of at least about 0.5 PSI, in some embodiments, from about 1 PSI to 60 PSI, in some embodiments, from about 5 PSI to 15 PSI, and, in some embodiments, more than 60 PSI.

Once inflated, the control system 140 can control the actuators 144 to move the leg assemblies 120 in coordinated fashion as desired to transit or walk the robot 100. In some embodiments, the controller 142 programmatically controls the actuators 146, in whole or in part. The controller 142 can pivot each leg assembly 120 up (FIG. 3A) and down (FIG. 3B) about the pivot axis P1-P1 at the joint J1, and can also pivot each leg assembly 120 fore (FIG. 3C) and aft (FIG. 3D) about the pivot axis P2-P2 at the joint J1. In FIGS. 3A-3D, a direction arrow toward an actuator 144 indicates that the cable 146 thereof is reduced in length (to draw the anchor point 148 toward the actuator 144), and a direction arrow away from the actuator 144 indicates that the cable 146 is increased in length to permit the anchor point 148 to move away from the actuator 144. The robot 100 may be controlled to walk using a tripod gait, for example.

If desired, the robot 100 can thereafter be deflated (in whole or in part) for storage and/or transport.

Joints between compliant structures such as inflatable beams can be a difficult engineering challenge, especially when soft and compliant joints are required. For example, conventional crimp flexure style joints have limited rotational capability due to the geometry of the crimp or flexure joint (often no greater than 90-degrees without complex geometry).

According to some embodiments of the present invention, an innovative joint mechanism is employed that is particularly well-suited for use with dynamic inflatable structures in which a one-degree of freedom (DOF) joint between two inflatable links is required. The joint mechanism uses two or more flexible hinge members (e.g., ribbons or strips), on alternating sides of the link crossing at the hinge point to produce what is referred to herein as a "rolling flexure joint". In some embodiments, the rolling flexure joint includes at least three such ribbons (similar to a "Jacobs ladder" toy). The rolling flexure joint allows the ends of the inflatable structures or beams to roll over each other and provide up to 360 degrees of rotation with little or no resistive torque. The rotation of the ends of the coupled inflatable structures about the rolling flexure joint may be limited to one degree of freedom.

One weakness of the rolling flexure joint may be that the torsional and lateral stability is low or insufficient for the intended operations. In order to provide desired torsional and/or lateral stability to the rolling flexible joint sufficient to prevent movement of the coupled structural members out of the intended plane of movement during intended operations, the joint may be further provided with bracing members or collateral ligaments on either side of the rolling flexure joint. The collateral ligaments may be formed of a flexible material having no or limited elasticity such as Kevlar threads sewn directly to the links. This combination of a rolling flexure joint and substantially inextendible collateral ligaments can provide a completely soft joint that is highly stable, low torque, and 360 degrees rotational.

Figure 5:
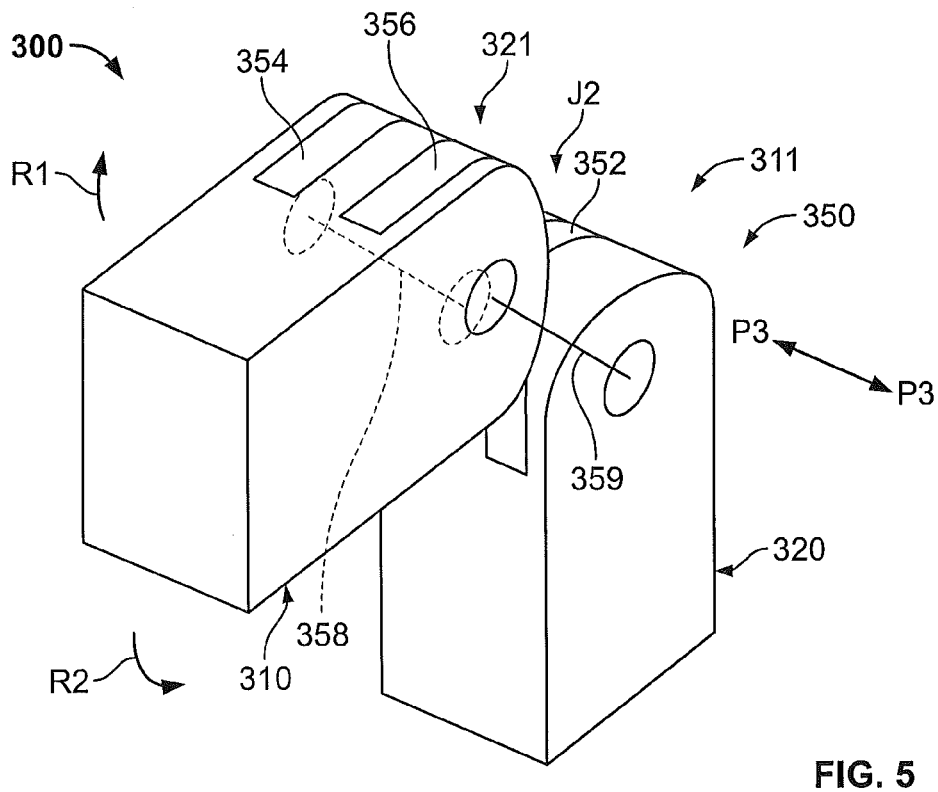
FIGS. 5 and 6 are fragmentary, perspective views of a jointed robotic assembly according to further embodiments of the present invention.
Figure 6:
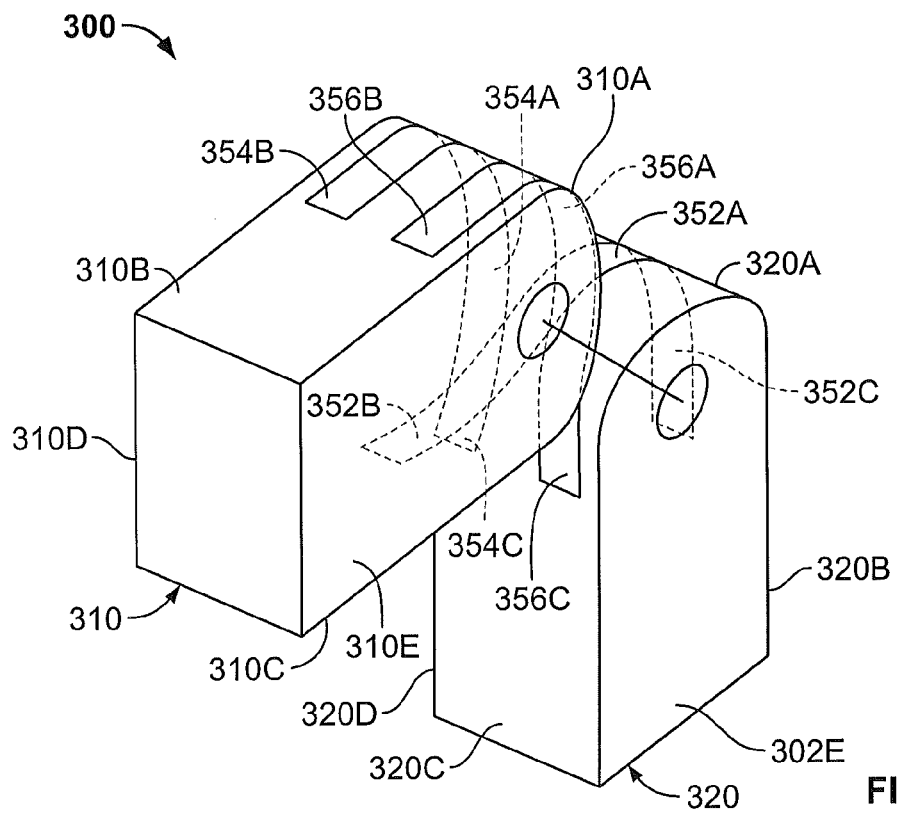

With reference to FIGS. 5 and 6, a jointed robotic assembly 300 according to embodiments of the present invention and embodying the above-described aspects is shown therein. FIGS. 5 and 6 illustrate a portion of the jointed robotic assembly 300, and the assembly 300 may further include various other components such as a controller, one or more actuators, etc.

The robotic assembly 300 includes a first inflatable structural member or beam 310 and a second inflatable structural member or beam 320 coupled or joined by a rolling flexure joint assembly 350 at proximal ends 311, 321 of the structural members 310, 320. The rolling flexure joint assembly 350 includes a center ribbon 352, an outer ribbon 354, an outer ribbon 356, and a pair of collateral ligaments 358, 359 (not shown in FIG. 6). The rolling flexure joint assembly 350 permits the structural members 310, 320 to pivot in one DOF about a pivot axis P3-P3, in a prescribed plane of movement, at a joint J2.

The structural member 310 has an end surface 310A, side surfaces 310B, 310C on opposed sides of the end surface 310A, and side surfaces 310D, 310E on opposed sides of the end surface 310A. The structural member 320 has an end surface 320A, side surfaces 320B, 320C on opposed sides of the end surface 320A, and side surfaces 320D, 320E on opposed sides of the end surface 320A. The end surfaces 310A, 320A may be curved in profile to provide smooth transitions between the end surface 310A and the side surfaces 310B, 310C and between the end surface 320A and the side surfaces 320B, 320C.

The center ribbon 352 has an intermediate section 352A and opposed end sections 352B and 352C. The outer ribbon 354 has an intermediate section 354A and opposed end sections 354B and 354C. The outer ribbon 356 has an intermediate section 356A and opposed end sections 356B and 356C.

The end section 352B is secured or anchored to the side surface 310C, the end section 352C is secured or anchored to the side surface 320B, and the intermediate section 352A extends across the joint J2 between the end surfaces 310A, 320A.

The end section 354B is secured or anchored to the side surface 310B, the end section 354C is secured or anchored to the side surface 320C, and the intermediate section 354A extends across the joint J2 between the end surfaces 310A, 320A. The end section 356B is secured or anchored to the side surface 310B, the end section 356C is secured or anchored to the side surface 320C, and the intermediate section 356A extends across the joint J2 between the end surfaces 310A, 320A. The ribbons 354 and 356 cross the ribbon 352 in the joint J2.

The collateral ligament 358 is anchored to each of the side surfaces 310D and 320D. The collateral ligament 359 is anchored to each of the side surfaces 310E and 320E.

The end sections of the ribbons 352, 354, 356 and the collateral ligaments 358, 359 may be secured to the structural members 310, 320 by stitching and/or adhesive, for example.

Thus, the outer ribbons 354, 356 are attached to a first side of the member 310, pass between abutting or adjacent ends of the members 310, 320 to attachment on an opposite side of the second member 320, while the inner ribbon is attached to a side of the first member 310 that is opposite the side to which the outer ribbons 354, 356 are attached and runs between the adjacent or abutting ends of the members 310, 320 to attachment to a side of the second member 320 that is opposite the side to which the outer ribbons 354, 356 are attached. Each collateral ligament 358, 359 is attached to one side of the first member 310 and a corresponding side of the second member 320, wherein the attachment sides are spaced apart along the pivot axis P3-P3.

In use, the structural members 310, 320 can be relatively pivoted about the pivot axis P3-P3 (in directions R1 and 112; FIG. 5) such that the end surfaces 310A and 320A roll over one another. According to some embodiments, the rolling flexure joint assembly 350 allows the joint J2 to have 360 degrees of rotation in a single plane. The flexible ribbons 352, 354, 356 will wrap about or unwrap from the end surfaces 310A, 320A to permit this rotation while maintaining the joinder or connection between the adjacent ends of the structural members 310, 320. According to some embodiments, the ends 311, 321 of the structural members 310, 320 are compliant and will be deformed by rotation of the structural members 310, 320 about the joint J2. The collateral ligaments 358, 359 provide lateral and torsional stability to the joint J2 to prevent or inhibit the members 310, 320 from moving out of the prescribed plane of rotation.

Notably, the rolling flexure joint assembly 350 presents a soft, flexible structure that allows the joint assembly 350 to be compact when the robotic assembly 300 is deflated for stowing.

The ribbons 352, 354, 356 may be formed of any suitable flexible material(s) having the appropriate flexibility and strength. According to some embodiments, the ribbons 352, 354, 356 are substantially non-extendible. Suitable materials for the ribbons 352, 354, 356 may include textiles (such as cotton, Kevlar, etc.) or plastics (such as polyethylene, PVC, etc.).

The collateral ligaments 358, 359 may be formed of any suitable material(s). According to some embodiments, the ligaments 358, 359 are substantially non-extendible. According to some embodiments, the ligaments 358, 359 are flexible. Suitable materials for the ligaments 358, 359 may include metal wire, steel cable, or Kevlar threads.

According to still further embodiments, the structural members 310, 320 may be replaced with compliant structural members that are deformable by rotation of the structural members about the joint J2, but which are not inflatable. For example, the coupled structural members may be formed of a semi-rigid elastomeric material (e.g., rubber rods).

Figure 7:
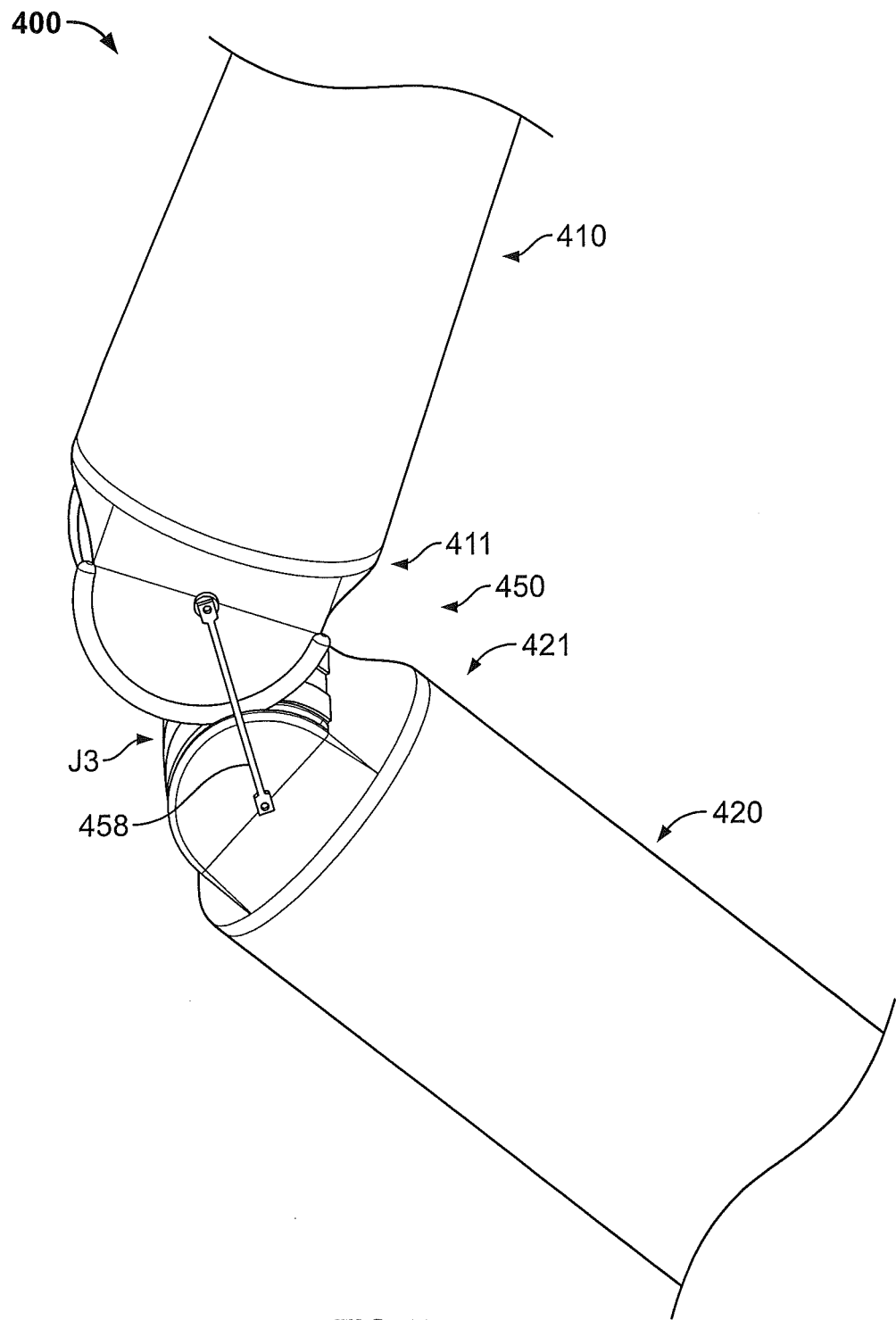
FIG. 7 is a fragmentary, perspective view of a jointed robotic assembly according to further embodiments of the present invention.

With reference to FIG. 7, a jointed robotic assembly 400 according to further embodiments of the present invention is shown therein. The robotic assembly 400 includes a first structural member 410 and a second structural member 420 coupled or joined by a rolling flexure joint assembly 450 at proximal ends 411, 421 of the structural members 410, 420. The jointed robotic assembly 400 differs from the jointed robotic assembly 400 in that the structural members 410, 420 are substantially rigid and not deformable by rotation of the structural members 410, 420 about the joint J3 (which includes a collateral ligament 458 on each opposed side surface of the joint J3).

With reference to FIGS. 8-11, a mobile robot 500 according to further embodiments of the present invention is shown therein. The robot 500 includes a mobile base 510, a robotic arm assembly 520, and a control system 560.

Figure 9:
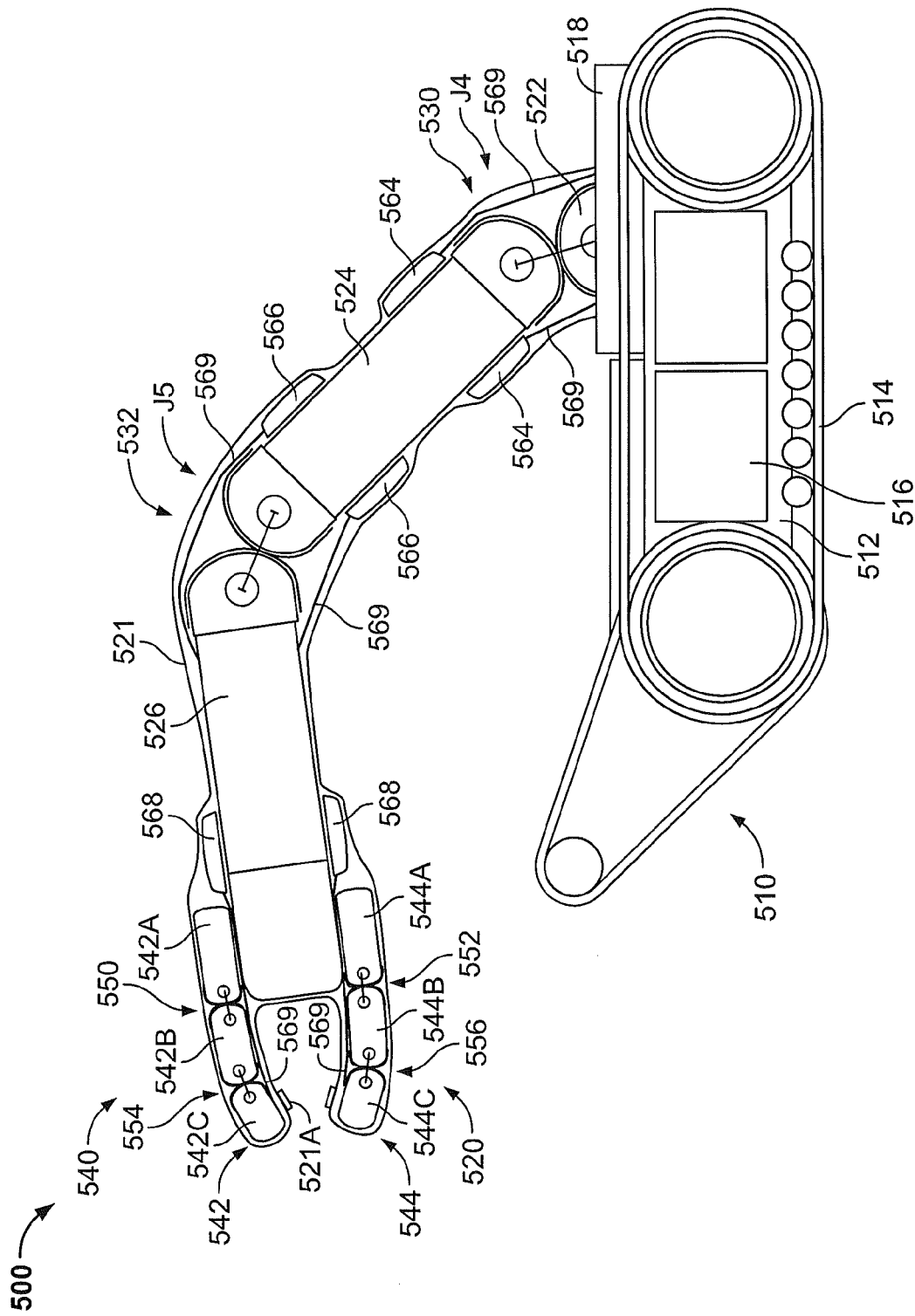

With reference to FIG. 9, the base 510 includes a chassis 512, tracks 514 and a motor 516 operable to drive the tracks to move the robot 510. A hold 518 is provided in the chassis 512. It will be appreciated that mobile base 510 may take other forms and use other modes and motivators for transport.

The robotic arm assembly 520 is mounted on the base 510 to be conveyed thereby. The arm assembly 520 includes a base structure or post 522, a proximal arm structural member, beam or link 524, a distal arm structural member, beam or link 526, and an end effector assembly 540.

The proximal arm link 524 and the distal arm link 526 are each flexible, inflatable structures and may be constructed in the manner described above with the regard to the structural members 110, 122, 124.

The proximal arm link 524 is coupled to the base post 522 by a rolling flexure joint assembly 530 at a shoulder joint J4. The distal arm link 526 is coupled to the proximal arm link 524 by a rolling flexure joint assembly 532 at an elbow joint J5. The rolling flexure joint assemblies 530, 532 may be constructed and function in the manner described above with the regard to the rolling flexure joint assembly 350.

The end effector assembly 540 includes a pair of opposed fingers 542 and 544. The finger 542 includes a base phalange structural member or link 542A, a proximal phalange structural member or link 542B, and a distal phalange structural member or link 542B. Similarly, the finger 544 includes a base phalange link 544A, a proximal phalange link 544B, and a distal phalange link 544B. The base phalange links 542A and 544A are coupled to the proximal phalange links 542B and 544B by rolling flexure joint assemblies 550 and 552, respectively. The distal phalange links 542C and 544C are coupled to the proximal phalange links 542B and 544B by rolling flexure joint assemblies 554 and 556, respectively. The rolling flexure joint assemblies 550, 552, 554, 556 may be constructed and function in the manner described above with the regard to the rolling flexure joint assembly 350.

Figure 10:
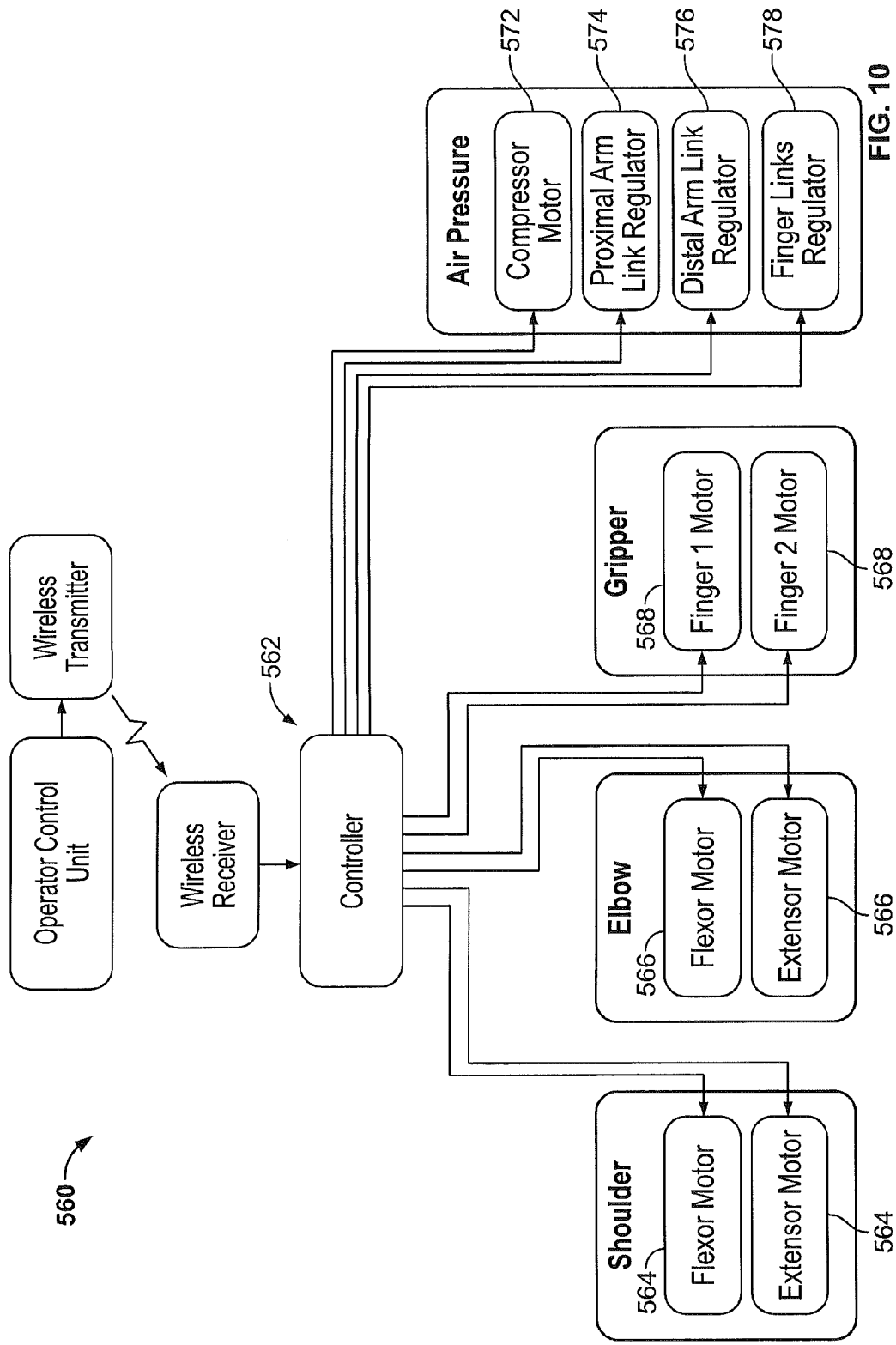
FIG. 10 is a schematic diagram representing a control system of the robot of FIG. 8.

With reference to FIGS. 9 and 10, the control system 560 includes a controller 562, a pair of shoulder actuators 564, a pair of elbow actuators 566, and a pair of finger actuators 568.

The shoulder actuators 564 are secured to the link 524 and have cables 569 secured to the base post 522. The elbow actuators 566 are secured to the link 524 and have cables 569 secured to the link 526. The shoulder actuators 564 are operable to rotate the link 524 in either direction about the joint J4 and the elbow actuators 566 are operable to rotate the link 526 in either direction about the joint J5.

Each finger actuator 568 has a cable 569 anchored to a respective distal phalange link 542C, 544C and slidably coupled (e.g., by eyelets) to the intervening base phalange link 542A, 544A and proximal phalange link 542B, 544B. The finger actuators 568 are operable to pull the fingers 542, 544 together to a closed position such that the phalanges links 542B, 544B, 542C, 544C pivot about the rolling flexure joint assemblies 552, 554, 556. According to some embodiments and as illustrated, the end effector 540 is under-actuated. The fingers 542, 544 may be biased (e.g., by biasing bands) such that, upon release by the actuators 568, the fingers 542, 544 will return to an open position as shown in FIG. 9.

Figure 8:
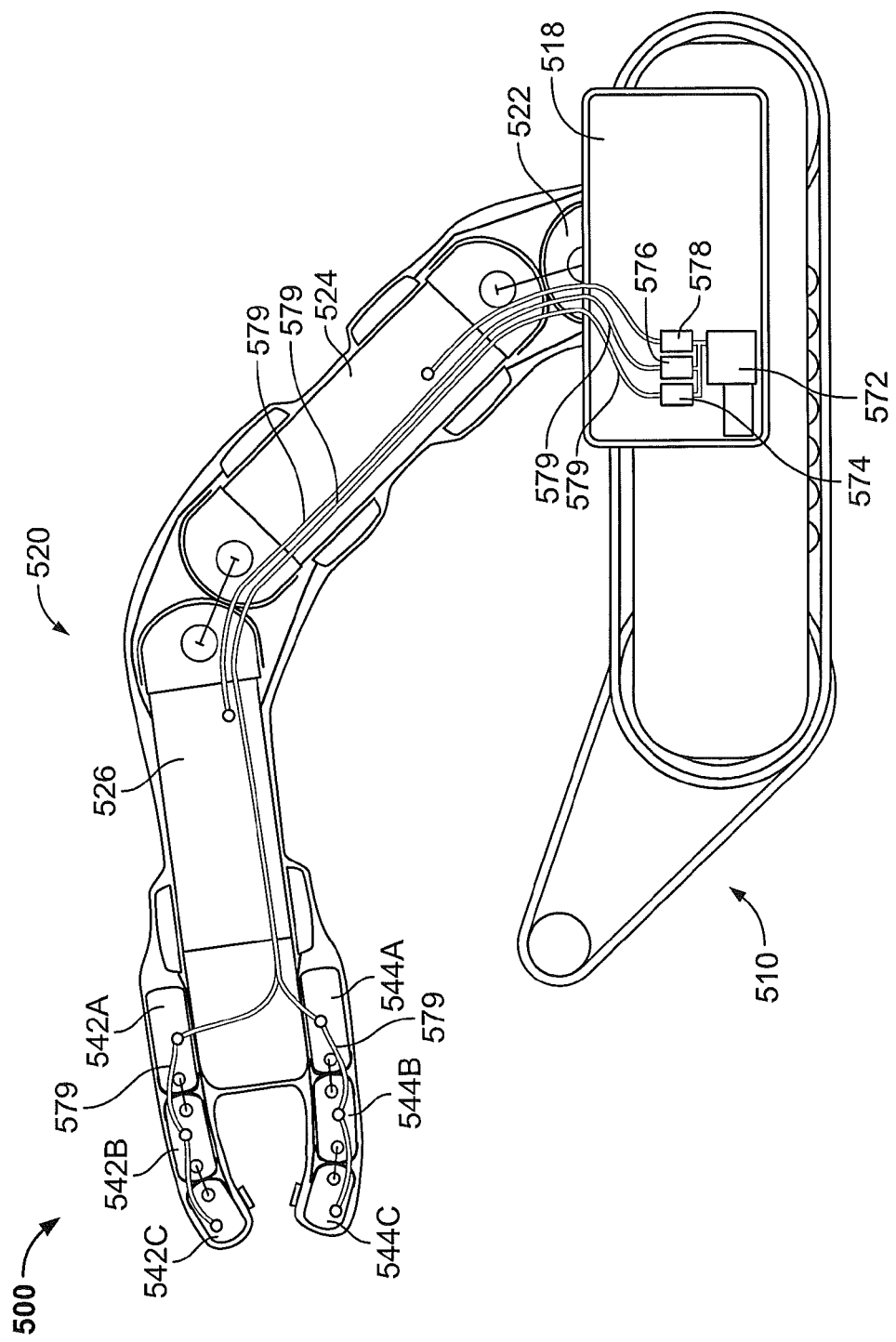
FIGS. 8 and 9 are fragmentary, side views of a robot according to further embodiments of the present invention.

With reference to FIGS. 8 and 10, the control system 560 further includes an air compressor 572, a proximal link pressure regulator 574, a distal link pressure regulator 576, a finger link pressure regulator 578, and pneumatic conduits 579 (e.g., flexible tubing), which together with the controller 562 constitute an inflation pressure control system. The compressor 572 is fluidly connected to the regulators 574, 576, and 578, which are in turn fluidly connected to the air containment membranes of the proximal link 524, the distal link 526, and the phalange links 542A, 542B, 542C, 544A, 544B, 544C, respectively, as shown in FIG. 8.

The arm assembly 520 (FIG. 9) may be shrouded by a sleeve or cover 521 (shown in cross-section). The cover 521 may be provided with grip pads 521A at the contact regions of the fingers 542, 544.

The robot 500 may be used as follows in accordance with some embodiments of the present invention. However, it will be appreciated that the robot 500 may be employed and operated in various other ways and for other applications.

Figure 11A:
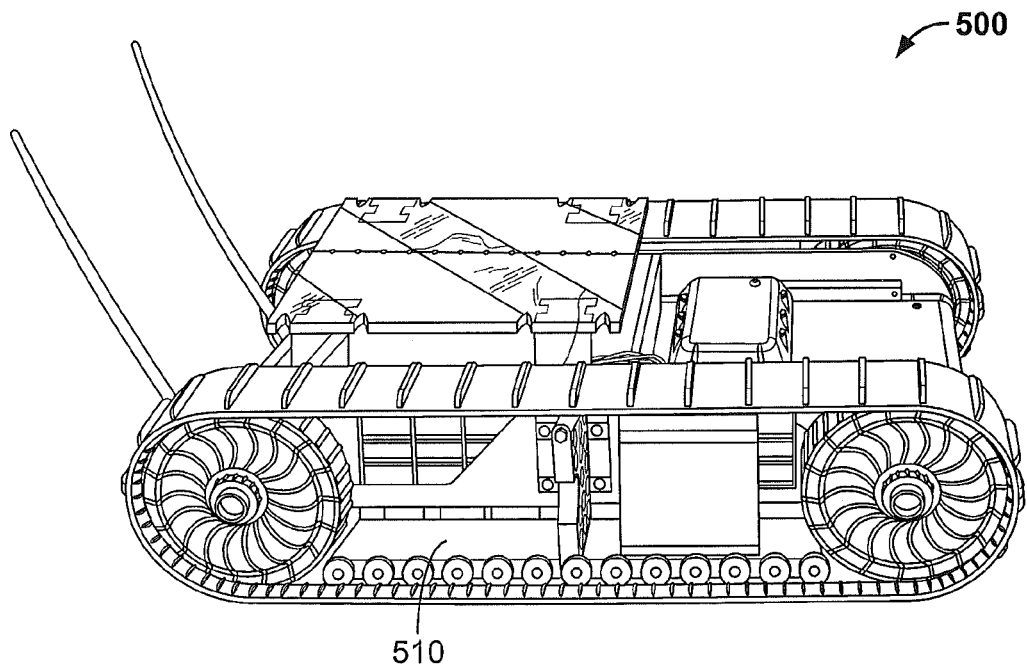
FIGS. 11A-11E are perspective views of the robot of FIG. 8 illustrating a sequence for deploying a robotic arm assembly forming a part of the robot.
Figure 11B:
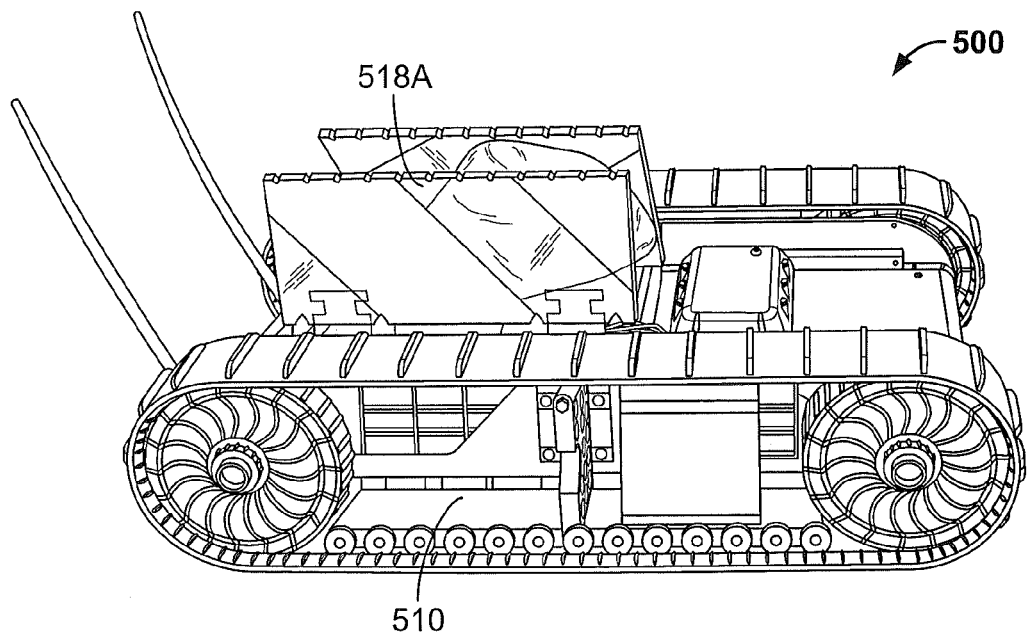
Figure 11C:
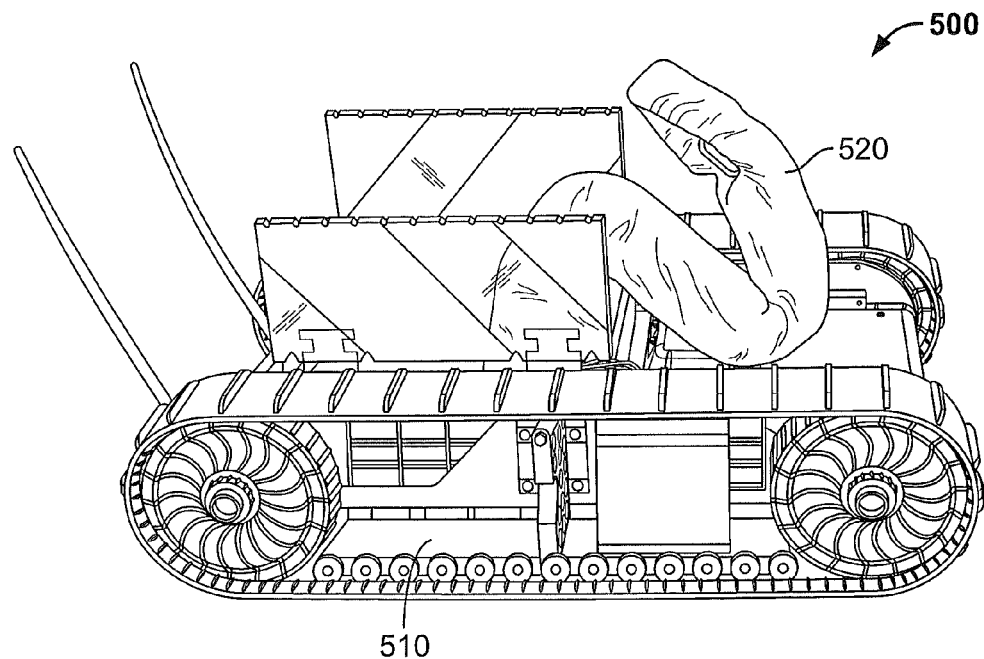
Figure 11D:
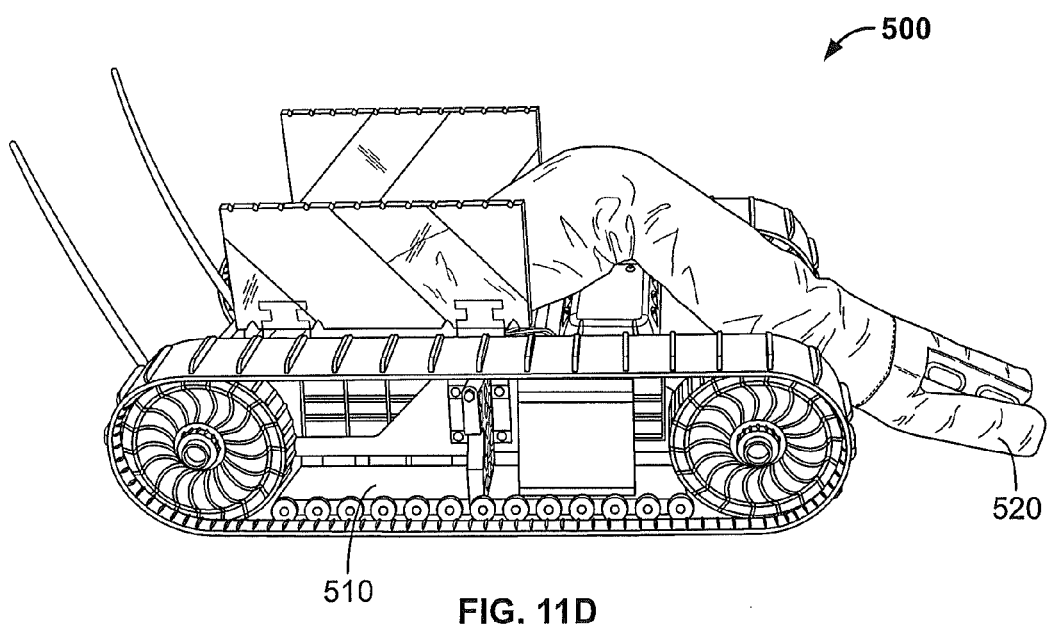
Figure 11E:
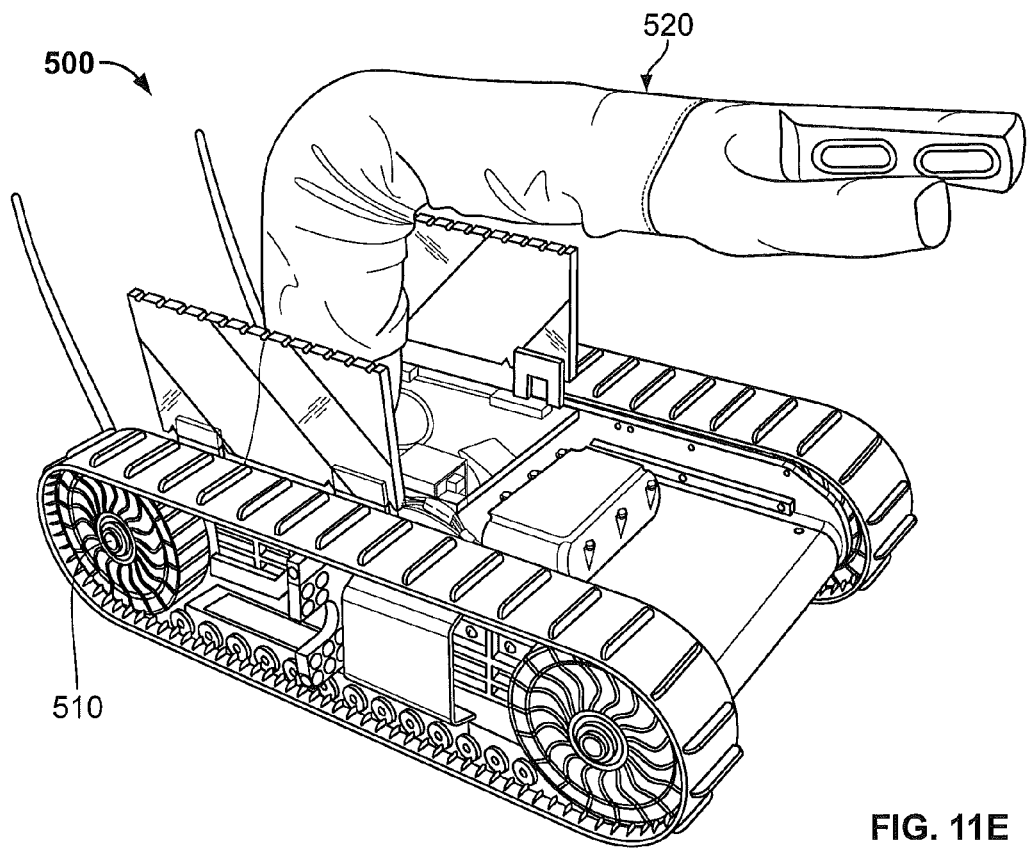

Initially, the arm assembly 520 can be compacted and stowed in the hold 518 as shown in FIG. 11A. More particularly, one or more (in some embodiments, all) of the links 524, 526, 542A-C, and 544A-C can be partially or fully deflated and arm assembly 520 can be folded or otherwise compacted and positioned in the hold 518. A door or doors 518A may be closed over the hold 518 to contain and protect the stowed arm assembly 520.

The arm assembly 520 may thereafter be deployed for use. In order to deploy the arm assembly 520, the controller 562 actuates the compressor 572 and the regulators 574, 576, 578 to force air into the links 524, 526, 542A-C, and 544A-C, thereby inflating the links 524, 526, 542A-C, and 544A-C to the configurations shown in FIG. 9. As the arm assembly 520 is inflated, it will progressively unravel from its compacted state and emerge from the hold 518 as shown in FIGS. 11B-11E.

Because the internal air pressures of the proximal link 324, the distal link 326, and the phalange links 542A-C, 544A-C are controlled by respective regulators 574, 576, and 578, their respective inflation pressures can be set independently of one another. For example, the links 524, 526 can be inflated to a first, relatively high pressure to provide high rigidity for load support and the links 542A-C, 544A-C can be inflated to a second pressure less than the first to provide more compliance for gripping objects. According to further embodiments, with suitable modifications, the control system 560 may be configured to inflate some or all of the phalange links to different respective pressures, if desired.

With the arm assembly 520 deployed and inflated as desired, the end effector assembly 540 can be positioned by pivoting the links 524, 526 about the joints J4, J5 using the corresponding actuators 564, 566, and the fingers 542, 544 can be used to manipulate (e.g., grab and release) objects and structures using the actuators 568. The robot 500, and thereby the arm assembly 520, can be moved about using the motor 516 and tracks 514 with the arm assembly 520 stowed or deployed.

If desired, the inflation pressures in the links 524, 526, 542A-C, and 544A-C can be re-adjusted to retune the compliances of the links 524, 526, 542A-C, and 544A-C. Such retuning may be executed actively or dynamically between or during missions by the controller 562 using the compressor 572, for example. For example, phalange links 524, 526, 542A-C, and 544A-C may be inflated to a first, relatively low pressure and used to handle a delicate object, and then further inflated to a second, higher pressure to handle a less delicate object. Enabling variable compliance of the fingers 542, 544 by setting the pressures in the fingers 542, 544 can expand the mission capability and suitability of the robot 500

The arm assembly 520 may be re-compacted and again stowed in the hold 318 by deflating the links 524, 526, 542A-C, and 544A-C (e.g., using the regulators 574, 576, and 578), for example.

The robot 500 may operate untethered. Power for the control system 560 may be provided by the motor 516 or another power source such as a battery. The air compressor 572 may be replaced or supplemented by a reservoir of compressed air.

It will be appreciated that the arm assembly 520 may include more or fewer arm links, fingers and/or phalange links. For example, the end effector assembly 540 may include three or more fingers.

The robot 500 may operate untethered. Power for the control system 560 may be provided by the motor 516 or another power source such as a battery. The air compressor 572 may be replaced or supplemented by a reservoir of compressed air.

It will be appreciated that the arm assembly 520 may include more or fewer arm links, fingers and/or phalange links. For example, the end effector assembly 540 may include three or more fingers.

The arm assembly 520 may be mounted on a nonmobile platform or other type of mobile platform.

Figure 12:
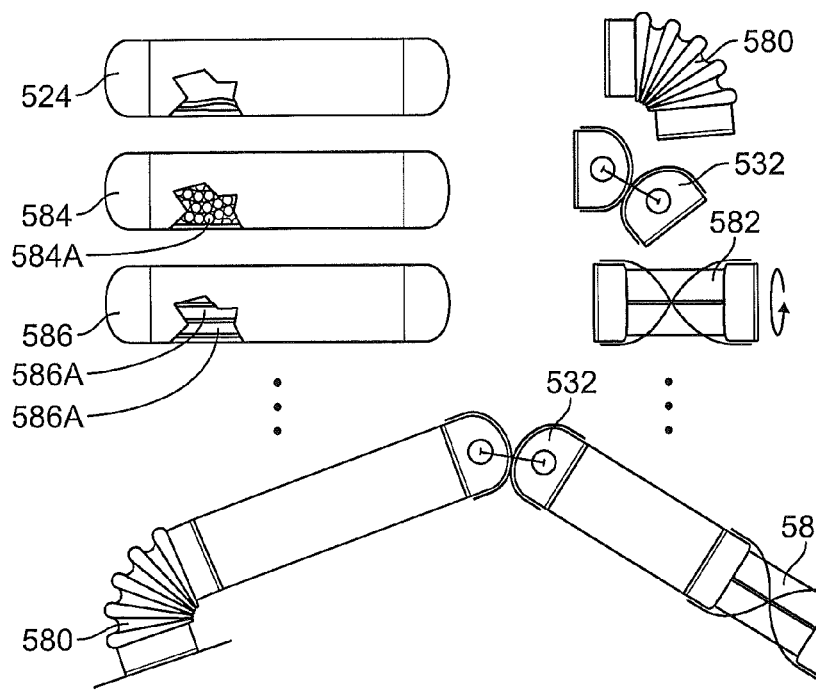
FIG. 12 illustrates various combinations of structural members and joint assemblies that may be used in jointed robotic assemblies according to embodiments of the present invention.

While rolling flexure joints 530, 532, 550, 552, 554, 556 have been described and shown between the links 524, 526, 542A-C, and 544A-C, other types of joint mechanisms or structures may be employed for some or all of the joints. For example, with reference to FIG. 12, suitable joint mechanisms may include a bellows joint connector 580 or a rotary joint connector 582.

While dual membrane inflatable structural members 524, 526, 542A-C, and 544A-C are described above, according to some embodiments, other types or constructions may be used. For example and with reference to FIG. 12, suitable structural members of other constructions may include a single ply inflatable structure (as discussed above), an inflatable structured member 584 having an internal cellular substructure 584A, or an inflatable structural member 586 having a plurality of tubular air containment substructures 586A. In some embodiments, some or all of the phalange links 542A-C and 544A-C are inflatable while the arm links 524, 526 are rigid, non-inflatable structures.

Figure 13:
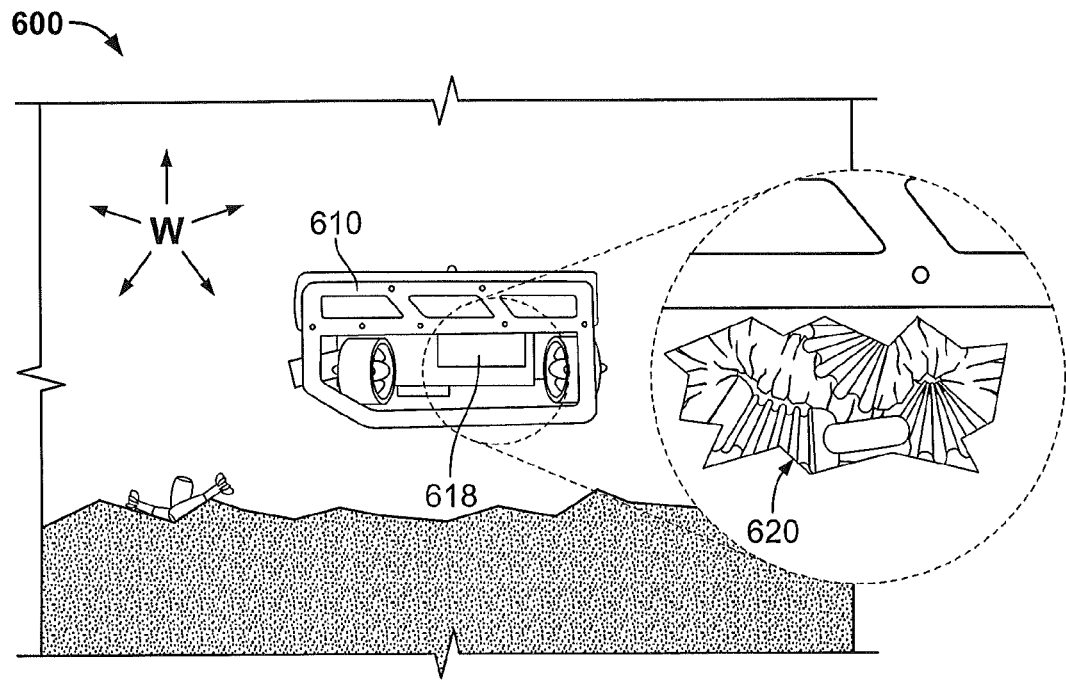
FIG. 13 is a side view of a submersible robot according to embodiments of the present invention in a body of a liquid submersion medium, wherein a robotic arm assembly of the robot is stowed.
Figure 14:
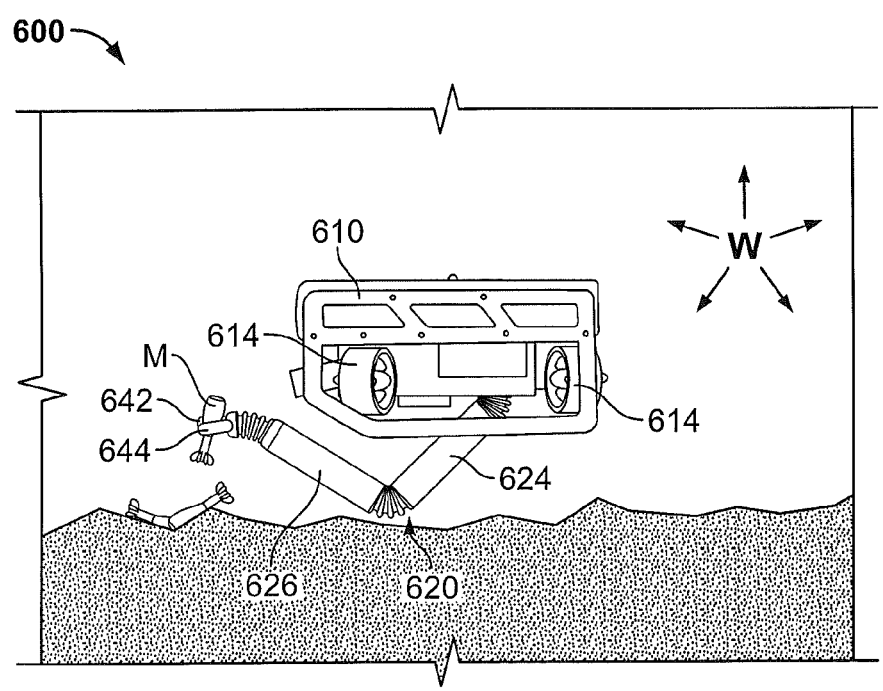
FIG. 14 is a side view of the robot of FIG. 13, wherein the robotic arm assembly is deployed.

With reference to FIGS. 13 and 14, a robot 600 according to further embodiments of the invention is shown therein in a liquid submersion medium W such as a body of water or oil. According to some embodiments, the robot 600 is an unmanned submersible vehicle or unmanned aquatic vehicle (UAV). The robot 600 includes a mobile base 610, an arm assembly 620, and a control system (not visible in the drawings) corresponding to the control system 560. The robot 600 may be used to manipulate objects, substances or apparatus (e.g., munitions M) in the submersion medium W.

The robot 600 corresponds generally to the robot 500 except that the robot 600 is configured for use in and/or on the submersion medium W. Propulsors 614 (e.g., propellers) are provided to drive and steer the robot 600 through the medium W. The arm assembly 620 may be stowed in and selectively deployed from a hold 618 in the manner discussed above with regard to the robot 500.

According to some embodiments, the links 624, 626 and the links of the fingers 642, 644 are inflatable structural members as described above, but are inflated with an inflation liquid rather than or in addition to an inflation gas. For example, the links may be filled with the submersion medium W (e.g., water). In this event, the air compressor of the robot 500 may be replaced with a water pump. Filling the links with the liquid submersion medium or other liquid may advantageously keep the arm 620 neutrally buoyant or closer to neutral buoyancy.

While certain actuators have been discussed above and illustrated in the drawings, inflatable robots and robotic assemblies according to embodiments of the present invention can use any suitable type(s) of actuators to effect movement of the inflated structures. Pneumatic or electromechanical actuators may used. Suitable pneumatic actuators may include McKibben actuators, pneumatic bellows actuators, or pneumatic nastic actuators. Suitable electromechanical actuators may include cable spoolers or twisted string actuators.

McKibben actuators use a woven mesh surrounding an expanding actuator to provide linear actuation. The mesh acts as a transmission and redirects outward expansion to linear contraction. Typical stroke is 25% to 30%. Pneumatic McKibben actuators can be fabricated from polyethylene cable mesh sleeving and natural rubber tubing, with few to no other rigid components. Therefore, pneumatic McKibben actuators, having few rigid components and inexpensive materials, make for an ideal actuation technology for inflatable structures. They can be attached as external modules or potentially be integrated into the fabric on the link or joint to provide one, two, three or more DOF joints. The use of such a soft actuation technology can enable completely soft-bodied manipulators/dynamic structures with adjustable compliance in both joints and links.

Bellows actuators can be built into the joints of the inflatable assembly (e.g., an inflatable arm). Articulation of the joint can be accomplished through pressurization of one or more of the bellows.

Nastic actuators can be built into the inflatable arm links which, when actuated, induced bending in the link. The link structural components, the joint articulation mechanism, and the actuation can all be integrated into one morphology. In addition, this morphology may be all fabric based, soft, and thus result in a completely soft arm, without any solid components.

Cable spooler actuation employs an electric motor driving a drum onto which an actuation tendon is wound. Selection of the drum diameter allows for customization of the transmission ratio for the specific application. The drum configuration allows for the development of an actuator capable of large amounts of linear travel within a small package. Though not as compact as a twisted string actuator terms of volume surrounding the electric motor, the cable spooling actuator does not require large lengths of free space along the path of the string.

A twisted string actuation system uses two strands of string and twists them together axially. This twisting results in a linear contraction of the string lengths, thus providing a mechanism for actuating joint motion. The twisted string transmission ratio (input torque/output force), governed by the string diameter, is generally extremely low. This allows for the use of very small and lightweight electric motors. Thus, the use of twisted string actuation matches well inflatable robotic applications, where size and weight may be of the utmost importance. Though extremely compact at the site of the motor implementation, twisted string requires a certain minimum length of free space in which the twisting can take place. The twisted segment of the string cannot pass over corners or guides as it greatly changes the performance and predictability of the actuator.

According to some embodiments, a flexible, collapsible (e.g., textile-based) pneumatic storage tank is provided to store compressed air to supply inflation air to the inflatable components. This may enable the capability to have a pneumatic reservoir onboard the robot to power pneumatic actuation while retaining a high packing density, low cost and low weight system.

According to some embodiments, the load bearing beams as described herein (e.g., the beams 110, 122, 124, 310, 320, 524, 526, 542A-C, and/or 544A-C) are inflated to an operating pressure in the range of from about 1 PSI to 60 PSI and, in some embodiments, in the range of from about 5 PSI to 15 PSI. According to some embodiments, these beams have a mass-to-volume ratio, when fully inflated, of at least about 0.1 g/cm$^3$, According to some embodiments, these beams have a payload-to-mass ratio of more than 2.5. According to some embodiments, the inflated-to-uninflated volume ratio of the beams is at least 10.

Inflatable robots and robotic assemblies according to embodiments of the invention can provide a number of advantages.

Variable compliance of the structural elements (e.g., individual structural links) and/or the joints of the robot enables safe interaction when in close proximity to humans or delicate objects or in unstructured environments, while still allowing for heavy lift capacity with the same structure. Modification of the internal pressures can be used to intelligently alter the mechanical properties of the robot structure, such as bending stiffness and buckling. Proper control of the internal pressure of specific chambers will allow the controller or operator to tune the robot for optimal operation in regimes including high strength, soft touch, and safe interaction with the environment.

The use of inflatable structural members can prevent damage to the robot or robotic assembly from overloading failure. The inflated structural elements can buckle under excessive payload weight, and thereafter recover once the excess weight is removed.

Dramatically reduced fabrication costs are possible compared to similarly sized traditional robot structures. Entire robot structures can be patterned on a sheet of fabric, sewn, and then inflated to form the three-dimensional robot. Pneumatic actuators, wiring, and sensors can be incorporated seamlessly into the robot membrane. Not only do inflatable structures tend to be inexpensive, but they also offer a low-energy production alternative, compared to many other robot structure materials, and are potentially environmentally friendly through the growing use of recyclable fabrics.

Facilitated by the lightweight and inexpensive nature of the materials used to construct inflatable structures, extremely large-scale robots are not only feasible to fabricate but also highly practical from a cost and logistical standpoint. In combination with the high packing density possible with inflatable robotics, large-scale inflatable robots can be deployed by airdrop from cargo planes, along with a fleet of smaller robotic systems capable of becoming an autonomous work crew for extended duration tasks. Large-scale legged platforms could provide massive cargo transport capabilities over extremely rough terrain otherwise not traversable by smaller ground platforms.

An advantage of inflatable structures is their extremely high packing density. Inflatable structures are capable of changing their external dimensions by more than an order of magnitude. This capability lends itself well to stowing robot limbs until their use is required, thus providing on-demand growth of new capabilities if required for the current task. The high packing density possible with inflatable structures makes them highly transportable in a deflated state. Small to medium scale robots could be packed into a backpack, or a large inflatable robot in the back of a vehicle (e.g., a Humvee), greatly simplifying logistics compared to transporting an equivalently sized robot with a traditional rigid structure. In an example scenario, an extremely large scale robot could be packed onto a shipping pallet, air dropped to a target location, and inflated at the destination.

The inflatable structures disclosed herein can provide a low mass to volume ratio, which may provide higher efficiency, may be suitable for amphibious systems, and may employ novel forms of actuation, such as explosive inflation (similar to automobile airbags).

Large variation in design morphology requiring minimal changes to the underlying technology is possible with inflatable structure technology. Joints can be easily and quickly designed into arbitrary locations along an inflatable beam, depending on the underlying beam design requirements.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An inflatable robotic assembly comprising:
    a support member;
    an end effector mounted on an end of the support member, the end effector including first and second inflatable finger members connected to enable the first and second fingers to be moved selectively between an open position and a closed position; and
    an actuator configured to move the fingers between the open and closed positions;
    wherein:
        the first finger includes first and second, relatively moveable, inflatable phalanges each having a proximal end;
        the first and second phalanges are arranged serially and are pivotally coupled to one another at their respective proximal ends by a pivot joint;
        the first and second phalanges each include an inner structural membrane and an outer structural membrane surrounding the inner structural membrane;
        each of the inner structural membranes contains a compressed gas;
        each of the outer structural membranes restricts radial expansion of the inner structural membrane to provide a dual-layer tensegrity structure;
        each of the outer structural membranes is formed of a textile; and
        the inflatable robotic assembly is configured such that the first and second fingers, including the first and second phalanges of the first finger, are each compliant when inflated and can be deflated into a compacted position for storage and/or transport.

2. The inflatable robotic assembly of claim 1 including a rolling flexure joint joining the first and second phalanges to provide at least one degree of freedom between the first and second phalanges.

3. The inflatable robotic assembly of claim 2 including a second rolling flexure joint joining the first finger and the support member to provide at least one degree of freedom between the first finger and the support member.

4. The inflatable robotic assembly of claim 2 wherein:
    the rolling flexure joint includes first and second flexible hinge members each having one end secured to the first phalange and an opposing end secured to the second phalange; and
    the first and second flexible hinge members cross one another between the first and second phalanges.

5. The inflatable robotic assembly of claim 4 wherein the first and second flexible hinge members are first and second ribbons.

6. The inflatable robotic assembly of claim 4 including a third flexible hinge member having one end secured to the first phalange and an opposing end secured to the second phalange, wherein the third flexible hinge member crosses the second flexible hinge member between the first and second phalange and the second flexible hinge member is interposed between the first and third flexible hinge members.

7. The inflatable robotic assembly of claim 4 wherein:
    the first phalange has a first end surface and first and second side surfaces on opposed sides of the first end surface;
    the second phalange has a second end surface and third and fourth side surfaces on opposed sides of the second end surface, the third side surface being substantially aligned with the first side surface, and the second side surface being substantially aligned with the fourth side surface;
    the first flexible hinge member is secured to the first side surface, extends across the first and second end surfaces, and is secured the fourth side surface; and
    the second flexible hinge member is secured to the second side surface, extends across the first and second end surfaces, and is secured the third side surface.

8. The inflatable robotic assembly of claim 2 wherein the rolling flexure joint includes at least one flexible collateral ligament secured to each of the first and second phalanges to provide torsional and lateral stability to the rolling flexure joint.

9. The inflatable robotic assembly of claim 1 including a rolling flexure joint joining the first finger and the support member to provide at least one degree of freedom between the first finger and the support member.

10. The inflatable robotic assembly of claim 9 wherein:
    the rolling flexure joint includes first and second flexible hinge members each having one end secured to the first finger and an opposing end secured to the support member; and
    the first and second flexible hinge members cross one another between the first finger and the support member.

11. The inflatable robotic assembly of claim 1 wherein the end effector is under-actuated.

12. The inflatable robotic assembly of claim 1 including an inflation pressure control system operable to selectively control inflation pressure in the first and second phalanges of the first finger and to thereby selectively tune compliance of the first and second phalanges, including inflating the first and second phalanges to different pressures from one another to independently set the rigidities of the first and second phalanges.

13. The inflatable robotic assembly of claim 12 wherein the inflation pressure control system includes a compressor or a supply of compressed inflation gas, and a controller.

14. The inflatable robotic assembly of claim 1 wherein:
the first phalange includes a first end surface on its proximal end;
the second phalange includes a second end surface on its proximal end;
the first and second end surfaces engage one another at the pivot joint; and
the proximal ends of the first and second phalanges are compliant.

15. The inflatable robotic assembly of claim 14 wherein the pivot joint is a rolling flexure joint.

16. The inflatable robotic assembly of claim 15 wherein:
the rolling flexure joint includes first, second and third flexible hinge members each having one end secured to the first phalange and an opposing end secured to the second phalange;
the first and second flexible hinge members cross one another between the first and second phalanges;
the third flexible hinge member crosses the second flexible hinge member between the first and second phalanges and the second flexible hinge member is interposed between the first and third flexible hinge members;
the first phalange has first and second side surfaces on opposed sides of the first end surface;
the second phalange has third and fourth side surfaces on opposed sides of the second end surface, the third side surface being substantially aligned with the first side surface, and the second side surface being substantially aligned with the fourth side surface;
the first flexible hinge member is secured to the first side surface, extends across the first and second end surfaces, and is secured the fourth side surface;
the second flexible hinge member is secured to the second side surface, extends across the first and second end surfaces, and is secured the third side surface;
the third flexible hinge member is secured to the first side surface, extends across the first and second end surfaces, and is secured the fourth side surface;
the inflatable robotic further includes an inflation pressure control system operable to selectively control inflation pressure in the first and second phalanges of the first finger and to thereby selectively tune compliance of the first and second phalanges, including inflating the first and second phalanges to different pressures from one another to independently set the rigidities of the first and second phalanges; and
the inflation pressure control system includes a compressor or a supply of compressed inflation gas, and a controller.

17. An inflatable robotic assembly comprising:
a support member;
an end effector mounted on an end of the support member, the end effector including first and second inflatable finger members connected to enable the first and second fingers to be moved selectively between an open position and a closed position; and
an actuator configured to move the fingers between the open and closed positions;
wherein:
the first finger includes first and second, relatively moveable, inflatable phalanges each having a proximal end;
the first and second phalanges are arranged serially and are pivotally coupled to one another at their respective proximal ends by a pivot joint;
the first phalange includes a first end surface on its proximal end;
the second phalange includes a second end surface on its proximal end;
the first and second end surfaces engage one another the pivot joint is a rolling flexure joint; and
the proximal ends of the first and second phalanges are compliant.

18. An inflatable robotic assembly comprising:
a support member;
an end effector mounted on an end of the support member, the end effector including first and second inflatable finger members connected to enable the first and second fingers to be moved selectively between an open position and a closed position;
an actuator configured to move the fingers between the open and closed positions; and
an inflation pressure control system;
wherein:
the first finger includes first and second, relatively moveable, inflatable phalanges each having a proximal end;
each of the first and second phalanges includes an inflatable sealed chamber and the chambers are independent of one another such that the first and second phalanges can be inflated to different pressures from one another;
the first and second phalanges are arranged serially and are pivotally coupled to one another at their respective proximal ends by a pivot joint; and
the inflation pressure control system is operable to selectively control inflation pressure in the first and second phalanges of the first finger and to thereby selectively tune compliance of the first and second phalanges, including inflating the first and second phalanges to different pressures from one another to independently set the rigidities of the first and second phalanges.

* * * * *